United States Patent
Swann et al.

(10) Patent No.: US 11,965,467 B2
(45) Date of Patent: Apr. 23, 2024

(54) AIRCRAFT PROPULSION SYSTEM

(71) Applicant: ROLLS-ROYCE plc, London (GB)

(72) Inventors: Peter Swann, Derby (GB); Kevin M Britchford, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/941,358

(22) Filed: Sep. 9, 2022

(65) Prior Publication Data
US 2023/0184179 A1    Jun. 15, 2023

(30) Foreign Application Priority Data

Sep. 27, 2021   (GB) ...................................... 2113729

(51) Int. Cl.
*F02C 9/42* (2006.01)
*F02C 9/28* (2006.01)
*B64D 27/02* (2006.01)

(52) U.S. Cl.
CPC .................. *F02C 9/42* (2013.01); *F02C 9/28* (2013.01); *B64D 2027/026* (2013.01); *F05D 2220/323* (2013.01); *F05D 2270/051* (2013.01); *F05D 2270/053* (2013.01); *F05D 2270/333* (2013.01); *F05D 2270/335* (2013.01); *F05D 2270/71* (2013.01)

(58) Field of Classification Search
CPC . F02C 9/42; B64D 2027/026; F05D 2220/76; F05D 2270/13; F05D 2270/33
See application file for complete search history.

(56) References Cited

U.S. PATENT DOCUMENTS

| | | |
|---|---|---|
| 6,880,784 B1 | 4/2005 | Wilkinson et al. |
| 2010/0083632 A1 | 4/2010 | Foster et al. |
| 2010/0126178 A1 | 5/2010 | Hyde et al. |
| 2018/0230844 A1 | 8/2018 | Vondrell et al. |
| 2020/0153252 A1 | 5/2020 | Long |
| 2023/0150681 A1* | 5/2023 | Ramakrishnan ........ F02C 6/206 60/773 |

FOREIGN PATENT DOCUMENTS

| | | |
|---|---|---|
| EP | 3 360 783 A1 | 8/2018 |
| EP | 3 650 351 A1 | 5/2020 |

OTHER PUBLICATIONS

Sep. 22, 2022 Extended Search Report issued in European Patent Application No. 22192721.3.
Oct. 20, 2022 Extended Search Report issued in European Patent Application No. 22192722.1.
(Continued)

*Primary Examiner* — Katheryn A Malatek
(74) *Attorney, Agent, or Firm* — Oliff PLC (57) ABSTRACT

An aircraft propulsion system comprises first and second thrust producing gas turbine engines. The system comprises a controller configured to determine a required overall propulsion system thrust level, and determine an engine core power level contribution from each aircraft gas turbine engine such that the overall propulsion system produces a minimum overall noise level and meets the required overall propulsion system thrust level. In meeting the minimum overall noise level, at least the first and second gas turbine engines are operated at different engine core power settings.

16 Claims, 9 Drawing Sheets

(56) References Cited

OTHER PUBLICATIONS

Jun. 16, 2022 Search Report issued in British Patent Application No. 2113729.4.
Jun. 1, 2022 Search Report issued in British Patent Application No. 2113728.6.
U.S. Appl. No. 17/941,374, filed Sep. 9, 2022 in the name of Peter Swann et al.
Feb. 12, 2024 Office Action issued in U.S. Appl. No. 17/941,374.

* cited by examiner

AIRCRAFT PROPULSION SYSTEM

The present disclosure concerns a propulsion system for an aircraft, an aircraft comprising the propulsion system, and a method of controlling an aircraft propulsion system.

There is a continuing need to reduce noise levels generated by aircraft, particularly external noise levels generated during take-off and landing, when the aircraft is operated close to ground level.

There is also a continuing need for reduced fuel consumption in aircraft. Parallel hybrid aircraft have been proposed in order to reduce fuel consumption, in which an internal combustion engine is combined with one or more electric motors to drive one or more propulsory. Parallel hybrid systems can be distinguished from so-called "serial hybrid" systems, in that in a parallel hybrid system, a mechanical connection is provided by the internal combustion engine and at least one propulsor, with at least one electric motor driving either the same propulsor as that driven by the internal combustion engine, or a further propulsor.

According to a first aspect there is provided an aircraft propulsion system comprising;
at least first and second thrust producing gas turbine engines;
a controller configured to control the first and second gas turbine engines;
wherein the controller is configured to:
determine a required overall propulsion system thrust level; and
determine an engine core power level contribution from each aircraft gas turbine engine such that the overall propulsion system produces a minimum overall noise level and meets the required overall propulsion system thrust level; wherein
in meeting the minimum overall noise level, at least the first and second gas turbine engines are operated at different engine core power settings.

The inventors have found that, by operating the engines at different engine core rotational speeds during certain aircraft and engine conditions, noise can be minimised.

The aircraft propulsion system may comprise a first pair of thrust producing gas turbine engines and a second pair of thrust producing gas turbine engines, each pair being provided symmetrically at either side of an aircraft centreline.

Alternatively, the first gas turbine engine may be mounted substantially at a centreline of the aircraft, and a pair of second gas turbine engines may be mounted on port and starboard sides respectively of the aircraft.

Alternatively, the aircraft propulsion system may comprise first and second gas turbine engines mounted on port and starboard sides of the aircraft respectively.

Each gas turbine may comprise one or more compressor which may comprise one or more engine compressor handling bleed.

The controller may be configured to determine an individual noise contribution from one or more of a handling bleed, a bypass air flow and a core air flow for an associated engine power condition. The controller may be configured to determine an overall engine noise contribution for an associated engine power condition for each engine, and determine a combination of engine power conditions of the propulsion system which produce the required thrust at a minimum noise. The inventors have found that noise contributions from the compressor handling bleed, core flow and bypass flow vary depending on engine conditions. Consequently, overall aircraft noise can be managed by varying engine power conditions to minimise overall perceived aircraft noise.

The individual or overall noise contribution may comprise a perceived noise contribution, which may take into account at least noise frequency and amplitude. Advantageously, the overall perceived noise of the aircraft is reduced, The controller may comprise an online model such as a cost function, or a look-up table, to correlate overall engine noise contribution to an associated engine power condition.

The controller may be configured to operate the gas turbine engines in two or more groups to minimise thrust asymmetry when operating the engines at different engine core powers.

The aircraft propulsion system may comprise a hybrid propulsion system comprising at least one electric machine coupled to a propulsor of at least one propulsive gas turbine engine. The aircraft propulsion system may comprise a first electric machine configured to operate as a generator and coupled to a propulsor of the first gas turbine engine, and may comprise a second electric machine configured to operate as a motor and coupled to a propulsor of the second gas turbine engine. The propulsion system may comprise an electrical interconnector arranged to electrically interconnect the first and second electric machines.

The controller may be configured to control the one or more electric machine. The controller may be configured to transfer power from the first gas turbine to the second gas turbine. Advantageously, thrust of each engine can be maintained at similar levels, while operating each engine core at different power settings. Consequently, noise can be minimised while reducing thrust asymmetry, thereby reducing any requirement for rudder corrections and associated trim drag.

Each gas turbine engine may comprise a high-pressure engine core shaft mounted to a core compressor and a low-pressure engine propulsor shaft coupled to a propulsor. The propulsor shaft may be coupled to a booster compressor. Each gas turbine engine may further comprise an intermediate-pressure shaft coupled to an intermediate pressure compressor.

According to a second aspect of the disclosure there is provided an aircraft comprising the propulsion system of the first aspect.

According to a third aspect of the disclosure there is provided a method of operating an aircraft propulsion system, the aircraft propulsion system comprising:
at least first and second thrust producing gas turbine engines; the method comprising:
determining a required overall propulsion system thrust level; and
determining a thrust contribution from each aircraft gas turbine engine such that the overall propulsion system produces a minimum overall noise level and meets the required overall propulsion system thrust level; wherein
in meeting the minimum overall noise level, at least the first and second gas turbine engines are operated at different engine core power settings.

According to a fourth aspect of the disclosure there is provided a controller configured to carry out the method of the third aspect of the disclosure.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
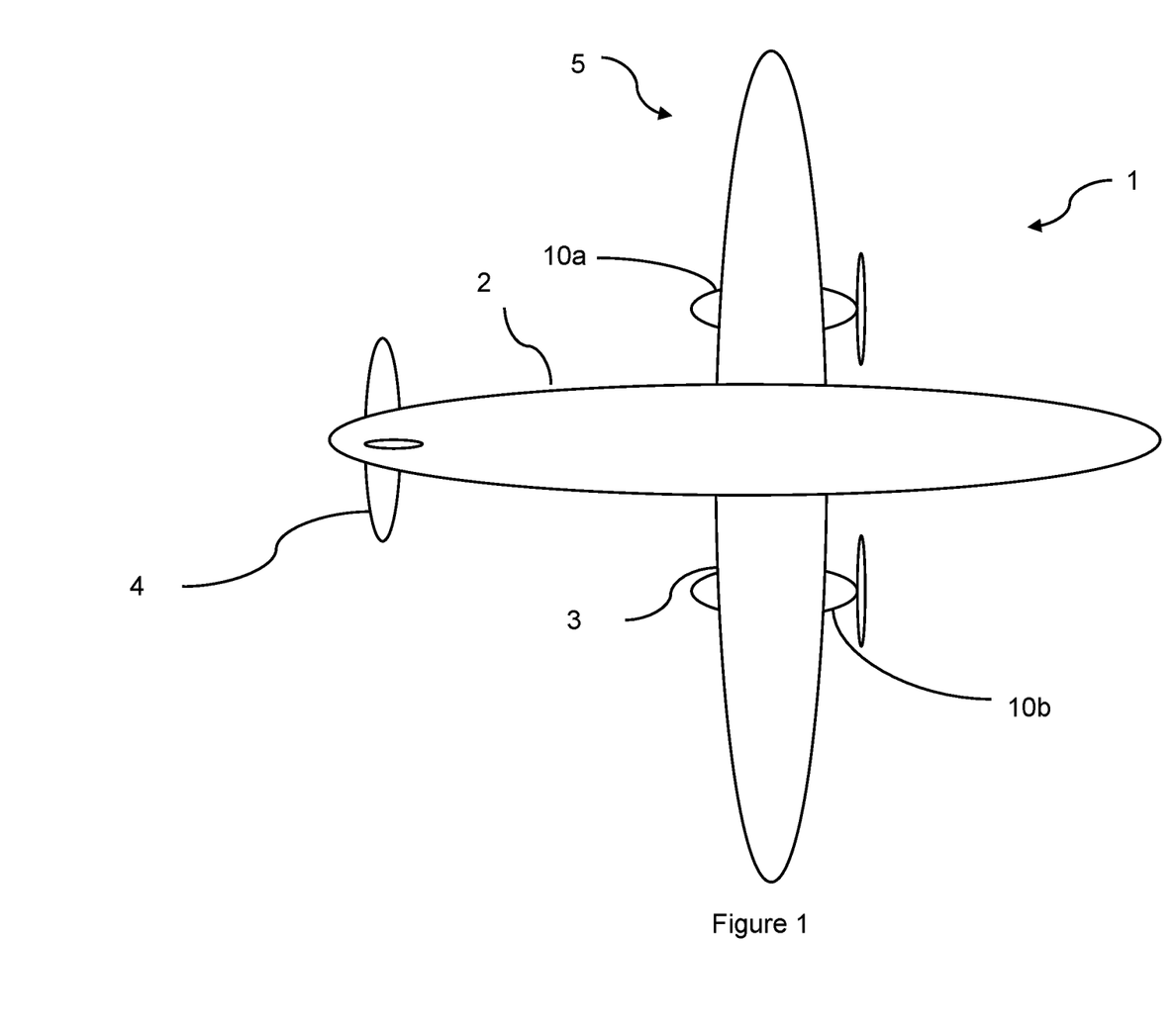
FIG. 1 is a plan view of a first aircraft comprising a propulsion system.

With reference to FIG. 1, an aircraft 1 is shown. The aircraft comprises a fuselage 2, wings 3, tail 4 and a propulsion system 5. The propulsion system comprises a plurality of propulsive gas turbine engines mounted to the wings 3 comprising a first gas turbine engine 10a provided on a port wing and second gas turbine engine 10b provided on a starboard wing. Part of the propulsion system 5 is shown in detail in FIG. 2.

Figure 2:
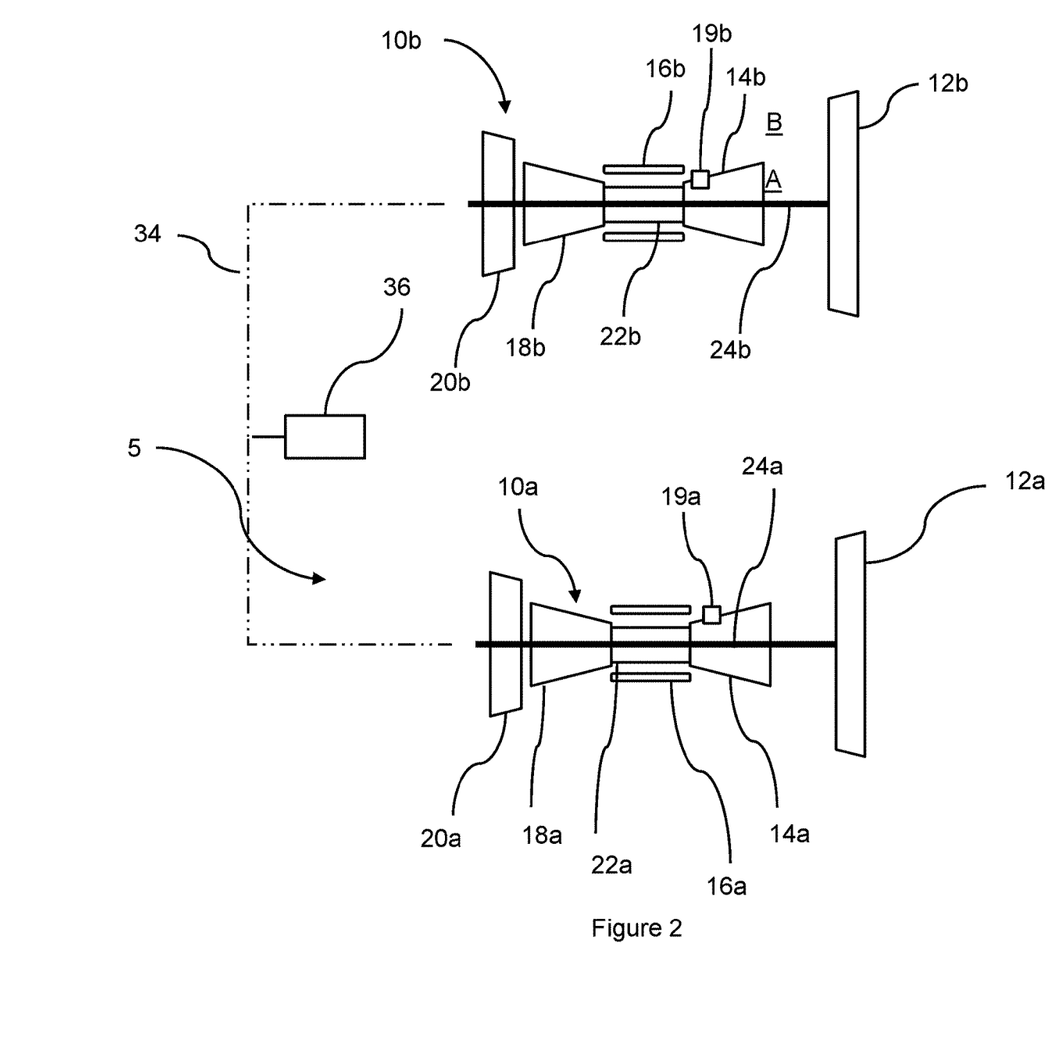
FIG. 2 is a schematic diagram of part of a propulsion system o the aircraft of FIG. 1.

FIG. 2 shows the propulsion system 5 schematically. Each gas turbine engine 10a, 10b comprises, in axial flow series, a propulsor in the form of a fan/propeller 12a, 12b, a compressor 14a, 14b, combustion equipment 16a, 16b and high and low-pressure turbines 18a, 18b, 20a, 20b.

The gas turbine engine 10 works in the conventional manner so that air is accelerated by the respective fan 12a, 12b to produce two air flows: a first core air flow A into the compressor 14a, 14b and a second bypass air flow B which bypasses the compressor 14a, 14b to provide propulsive thrust. The core air flows through the compressor 14a, 14b where it is compressed, before being delivered air to the combustion equipment 16a, 16b, where it is mixed with fuel and the mixture combusted. The resultant hot combustion products then expand through, and thereby drive, the turbines 18a, 18b, 20a, 20b before being exhausted through a nozzle to provide additional propulsive thrust. The high 18a, 18b and low-pressure turbines 20, 20, 20a, 20b drive respectively the compressor 14a, 14b and fan 12a, 12b, each by suitable high and low pressure interconnecting shaft 22a, 22b, 24a, 24b. Together, the low pressure turbine 20a, 20b, fan 12a, 12b and shaft 24a, 24b make up a low pressure propulsion spool, and the high pressure turbine 18a, 18b, compressor 14a, 14b and shaft 22a, 22b make up a high pressure core spool.

Other gas turbine engines to which the present disclosure may be applied may have alternative configurations. By way of example such engines may have an alternative number of interconnecting shafts (e.g. three) and/or an alternative number of compressors and/or turbines. For example, a booster compressor may be coupled to the low-pressure shaft 24a, 24b. Alternatively, a separate intermediate compressor and turbine (not shown) may be provided between the fan and high pressure compressor, and between the high and low pressure turbines respectively. Further, the engine may comprise a gearbox provided in the drive train from a turbine to a compressor and/or fan. The fan 12 may be replaced by a propeller, At least one compressor 14a, 14b of each gas turbine engine 10a, 10b comprises at least one handling bleed valve 19a, 19b. Each handling bleed valve 19a, 19b comprises a valve which communicates between the compressor core air flow within the respective compressor 14a, 14b and ambient air such as bypass air. The valves are of conventional construction, and are configured to operate between an open position, in which a portion of the compressed air is permitted to flow from the compressor core air flow to ambient, thereby bypassing subsequent compressor stages and turbomachinery, and a dosed position, in which all core air flow continues through the compressor, and into downstream turbomachinery, or internal engine cooling flows. In some cases, the valves 19a, 19b may be configured to operate at intermediate positions, wherein a portion of airflow is permitted to flow through the valve. Handling bleed valves are typically provided near the highest pressure stage of compressors. In some cases, multiple handling bleeds may be necessary. Other bleed valves such as customer bleed valves may be provided. However these typically provide flow to other aircraft systems rather than being exhausted to ambient, and so do not significantly contribute to engine noise generation.

Such handling bleeds are typically necessary in gas turbine engines, particularly where the engine comprises a relatively high-pressure ratio compressor. Typically, operation of the valves in the open position is necessary during operation at low core engine power, such as during approach and descent, By opening the valves, the pressure ratio across the compressor is reduced, thereby preventing stall or surge of the compressor at low engine rotational speeds. However, a problem arises in that operation of the handling bleed in the open position generates significant amounts of noise, in view of the high flow rates and velocities (in particular, the high Mach number) of this air, which is expelled into the ambient air stream. During approach, such handling bleeds may represent a significant proportion of the noise generated by the engine. On the other hand, it is necessary to frequently adjust thrust settings during approach, to maintain the aircraft on an appropriate flight path for landing.

Figure 3:
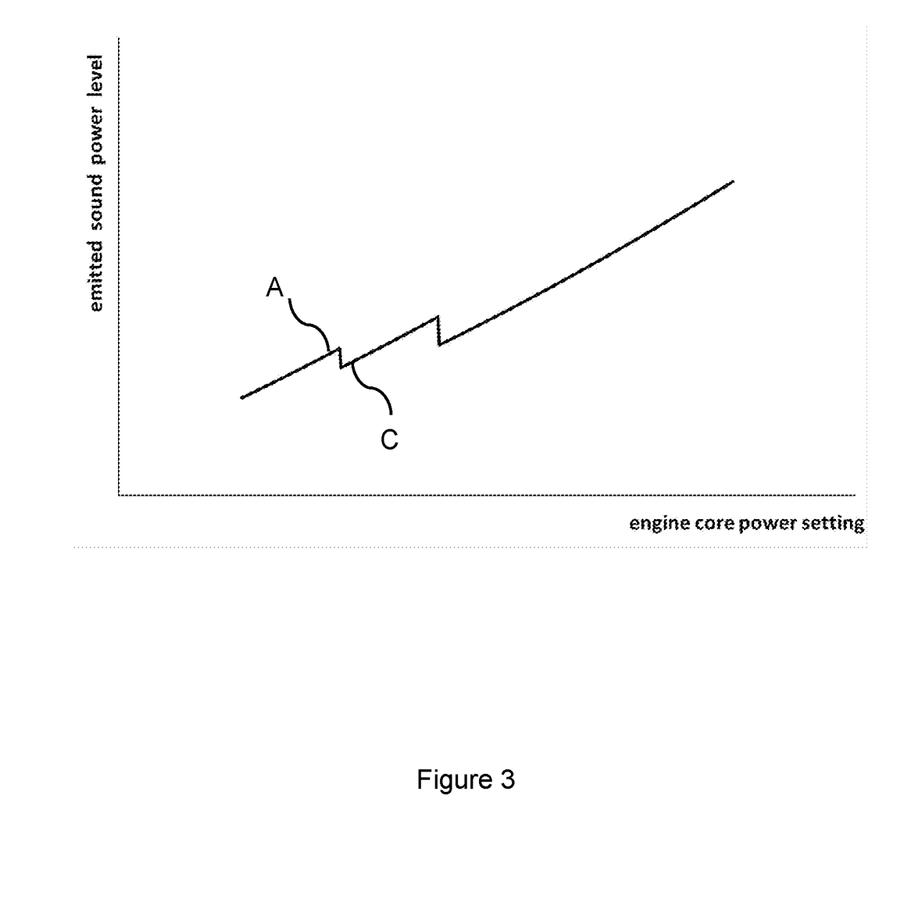
FIG. 3 is a graph correlating emitted sound power level with engine core power setting for an engine of the propulsion system of FIG. 1 or FIG. 2.

FIG. 3 is a graph which visually represents the correlation between noise generated by a gas turbine engine, and engine core power setting. As can be seen, there is a general trend from relatively low noise at low engine core power settings, to higher thrust at higher power settings. However, within this general trend there are a number of loci where reduction in engine power setting may result in an increase in engine noise. For example, when decelerating from point C on the graph to point A, engine power setting decreases, while engine noise increases. This is because operation of the engine at a thrust corresponding to engine core power setting A requires opening of a handling bleed valve to increase surge margin, whereas this valve will be closed at point C. Consequently, increased noise is generated at point A relative to point C. Such increased noise may be generated during final approach, where the aircraft is relatively close to the ground, and so it is desirable for noise to be minimised.

Additional sources of noise are also generated by the aircraft propulsion system. For example, the fan 12 generates noise, which again generally increases as a function of thrust, However, this increase may not be monotonic. For example, local noise maxima may occur at particular fan rotational speeds.

Consequently, the propulsion system 5 comprises a controller 36 (shown in FIG. 2) which is configured to operate the gas turbine engines of the propulsion system 5 to minimise noise. The controller 36 is in signal communication with each gas turbine engine 10a, 10b, and is capable of controlling at least gas turbine engine fuel flow to adjust engine core power setting of each engine 10a, 10b. For example, the controller 36 may comprise part of the aircraft auto-throttle system or engine FADEC (Full Authority Digital Engine Controller), or may comprise a separate additional controller. Otherwise, the controller 36 is of typical construction.

Figure 4:
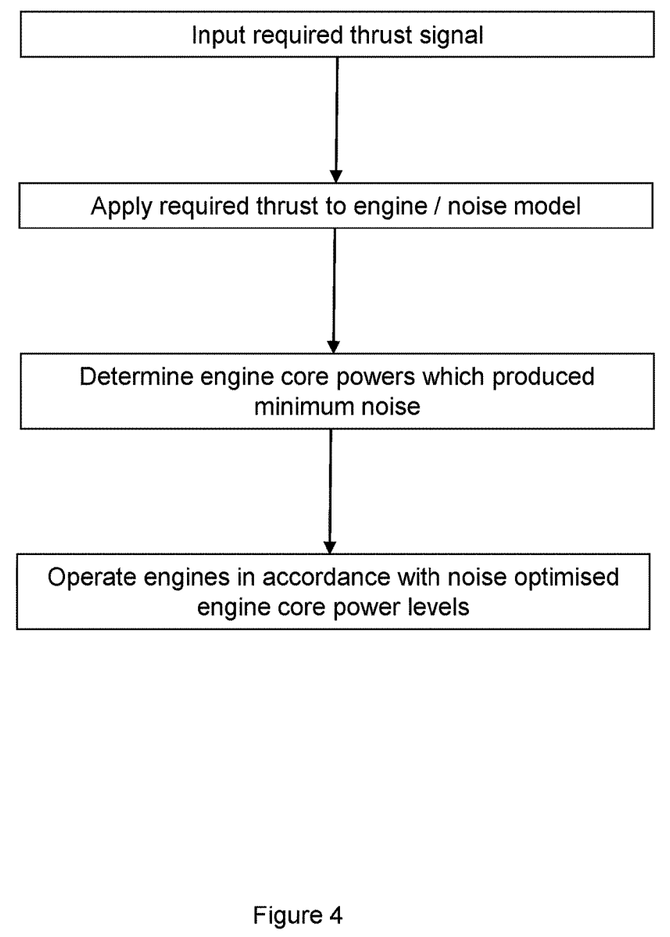
FIG. 4 is a flow diagram of a method of operating the propulsion system of FIG. 1.

FIG. 4 is a flow chart illustrating a method of operation of the controller 36 for operating the propulsion system 5. In a first step, a required thrust signal is input to the system, which is indicative of the thrust required at a propulsion system level. The required thrust signal may be provided by the pilot, by manually adjusting a throttle position, or by the autopilot controller, to maintain a desired flight path and airspeed for example.

In a second step, the required thrust signal is input to an engine thrust and noise model. The model may comprise an online model, which may model physical parameters of the propulsion system. Alternatively or additionally, the model may comprise a look-up table or series of look-up tables. For example, the model may comprise a correlation between engine thrust, corresponding engine core power, and corresponding noise from one or more noise contributors. Noise contributors will be understood to include the fan 12, turbine 18, 20 and handling bleeds 19. For example, increased engine core power will typically be correlated with increased thrust. This increased thrust may result in increased fan noise generation, but decreased handling bleed noise, due to the closure of one or more handling bleeds. Consequently, the noise model is able to calculate an associated overall gas turbine engine noise level with an associated engine core power level and thrust. A separate model may be required for each engine 10a, 10b, or the same model may be used for each engine.

In a third step, the model is explored by an optimiser to determine a combination of engine core power levels which results in a minimum total aircraft noise total level, and meets the required thrust level for the propulsion system as a whole. In some case, this minimum noise level will be achieved by operating each engine at the same thrust level, while in other cases, this minimum noise will be met by specifying differing thrust levels for the plurality of engines. However, in each case, the engine thrust of each engine is considered separately. For instance, since the only parameter that can be altered is individual engine thrust level, and total propulsive thrust must be maintained at the required thrust level, the optimiser may increase a proposed thrust of one engine within the model, and decrease the thrust of the other engine, such that the total engine thrust is maintained at the required level. The optimiser then selects a combination of engine core powers that provides the required thrust, with the lowest noise found during the optimisation process.

The optimiser may be implemented in various ways, as would be understood by the skilled person. For instance, the optimiser may comprise a cost function. Typically, since the engines are identical, one engine will be assigned as a "reduced thrust" engine, and the other as an "increased thrust" engine. To avoid the engines having different service lives, the engines may be assigned alternately. Since the only parameter to be considered is engine core power level, the search space is essentially one-dimensional.

In some cases, the minimum noise level may be the minimum noise level that can be achieved in accordance with one or more constraints. For example, the optimiser may determine one or more penalties associated with operation of the engines at differential thrust levels. For example, operation at differential thrusts may cause a yaw moment on the aircraft, which may in turn result in aircraft instability or increased drag. Consequently, the optimiser may calculate an associated yaw instability, and determine a minimum noise level operation that does not exceed a required thrust differential. Similarly, differential thrust may result in increased fuel consumption. The optimiser may comprise a weighting, which weights noise against other considerations such as fuel consumption. The optimiser may calculate a minimum noise level that can be achieved within prescribed fuel consumption constraints. Further constraints relating to engine life consumption may also be included in the optimiser. Another constraint may comprise minimum and maximum thrust levels. For instance, a minimum thrust level required for adequate acceleration performance may be specified, as well as a maximum rated engine thrust.

The optimiser may also comprise one or more "keep-out zones". For example, particular engine rotational speeds may result in engine damage, or reduced engine life. Similarly, operation close to handling bleed switching points may result in continual opening and closing of the valves, which may produce additional wear or noise. Consequently, the optimiser may be constrained from selecting engine core power levels in these zones. Alternatively, the optimiser may comprise hysteresis functions, which prevent continual slight increases and decreases in engine thrust.

Similarly, the minimum noise level may take into account the "perceived noise" of the propulsion system, rather than merely overall noise energy produced by the aircraft, In one instance, the noise model may determine a frequency associated with each noise contributor, or an overall engine noise frequency, and calculate an overall perceived noise generated by the aircraft using a perceived noise model, to minimise perceived noise.

In a fourth step, the controller 36 then inputs control commands to each engine 10a, 10b, to command each engine 10a, 10b to operate at the respective engine core power levels corresponding to the noise optimised levels found in the third step.

It will be appreciated that, where only two engines are provided, such a method will result in a thrust asymmetry where the minimum noise requires differential thrust from the two engines. Consequently, the method may comprise a differential thrust limit, which may limit the difference in thrust between the engines during the optimisation step. However, in any event, since thrust is relatively low during low power engine conditions, any thrust asymmetry will be minimal, and the aircraft will be able to accommodate this through the application of rudder trim.

The method of operation of the controller 36 may only be performed during certain circumstances. For instance, in a step preceding the above described first step, the controller 36 may ascertain whether one or more preconditions is satisfied. For instance, the system may ascertain whether the aircraft is in a landing mode prior to operating the engines in accordance with the method of FIG. 4. This may comprise for instance checking whether the engines are operating at below a predetermined maximum thrust for operation in accordance with the method, and/or whether the landing gear are deployed.

It will be appreciated that this system can be employed on other aircraft types. For instance, the system may be utilised on three or four-engine aircraft. In such a case, any thrust asymmetry will be minimised. The engines may be installed in different locations, such as the aircraft tail. In one embodiment, the system is employed on a three-engine aircraft. Such an aircraft is shown in FIG. 5.

Figure 5:
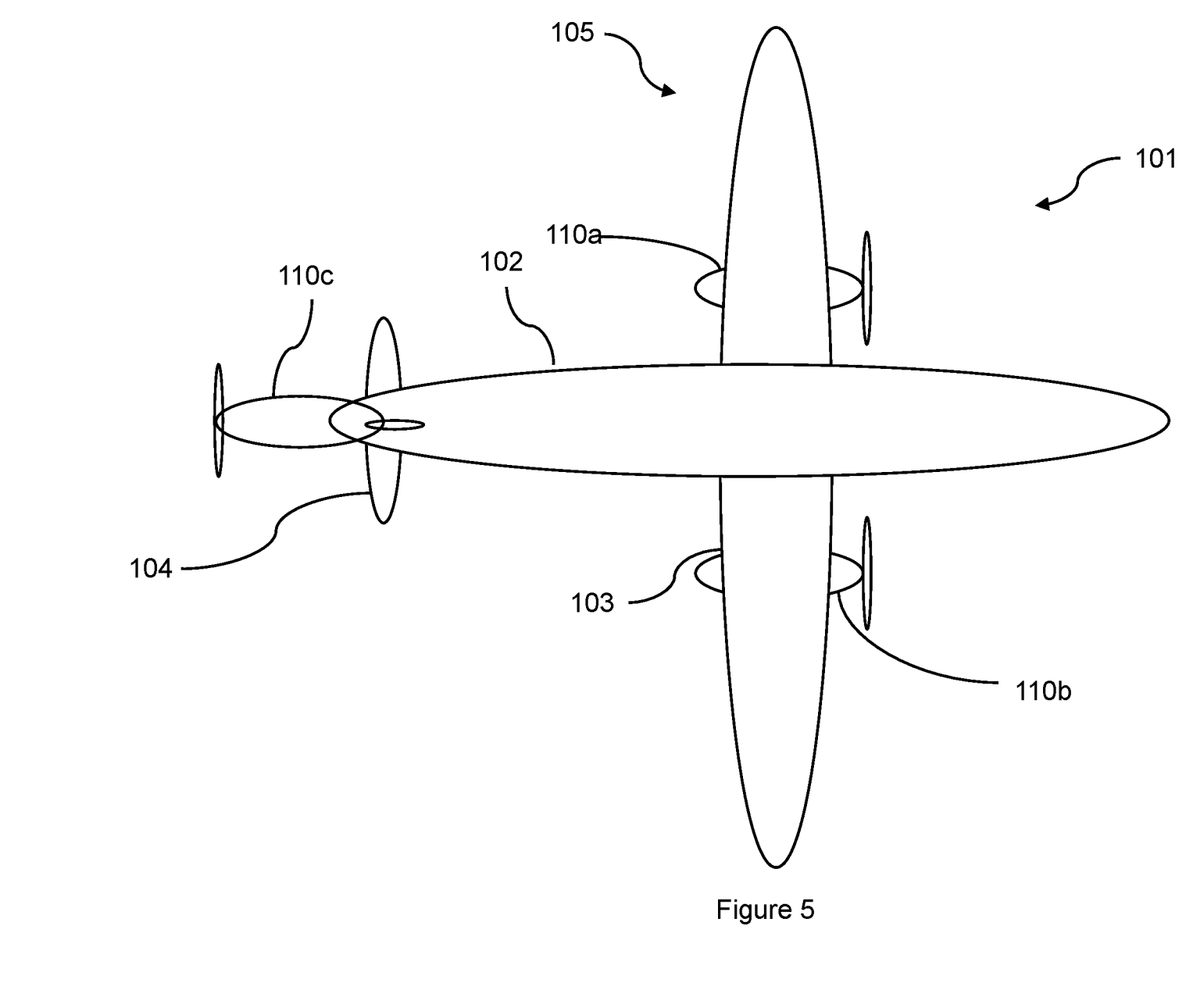
FIG. 5 is a plan view of an alternative aircraft comprising a propulsion system.

The aircraft 101 of FIG. 5 comprises a fuselage 102, wings 103 and tail 104, similar to those of the aircraft 1. The aircraft also comprises a propulsion system 105 comprising a plurality of gas turbine engines 110a-c. However in this case, a pair of engines 110a, 110b are installed on the wings 103, and a third engine 110c is provided in the tail.

The system comprises a controller (not shown) configured to operate the engines 110a-c in a similar manner to the method shown in FIG. 4. However, the method may constrain the thrust provided by the first and second engines 110a, b to be equal to one another, or at least closer in thrust compared to the third engine 110c. The optimiser is free to vary the thrust of the third engine 110c relative to the other engines 110a,c, without producing asymmetric thrust, since the third engine 110c is located at the aircraft centreline. Consequently, such a propulsion system may be more efficient than the system shown in FIG. 1, due to the reduced trim drag where the engines are operated at different thrusts.

Figure 6:
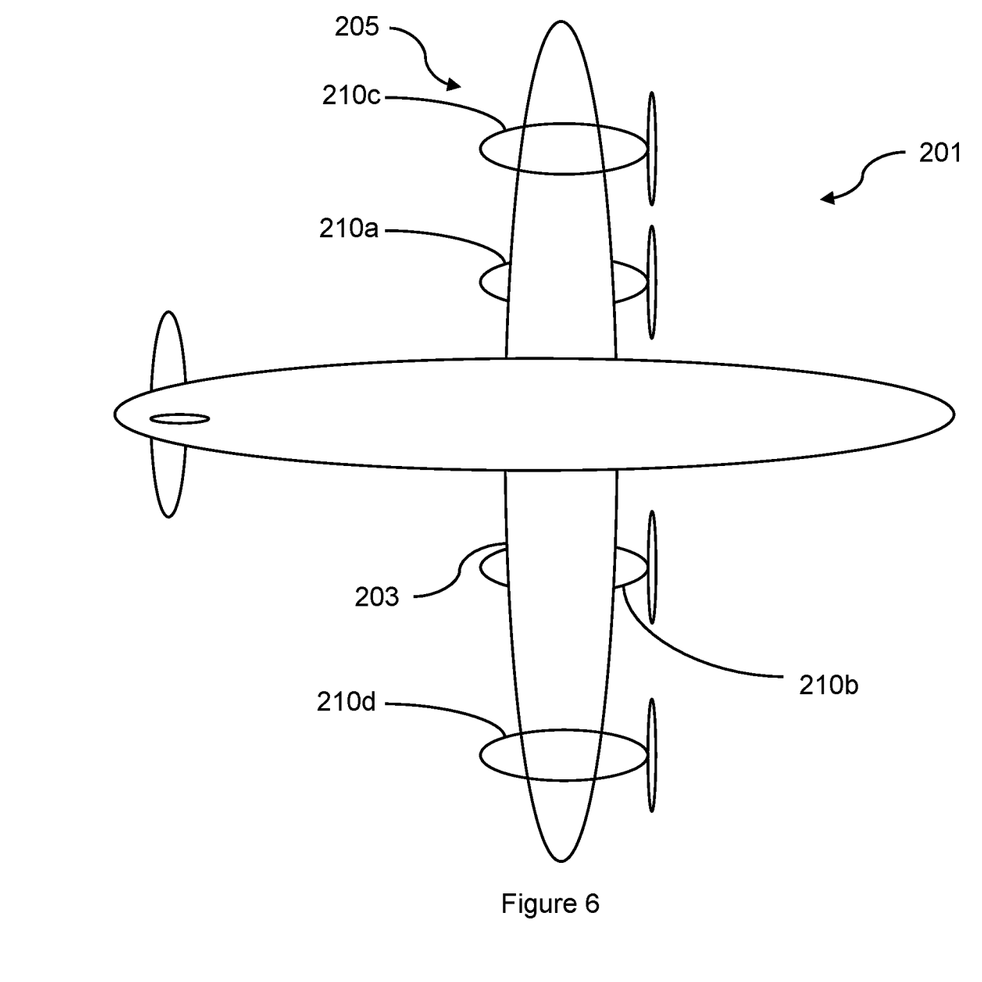
FIG. 6 is a plan view of further alternative aircraft comprising a propulsion system.

Similarly, FIG. 6 shows an aircraft 201 having a propulsion system 205 comprising four engines 210a-d installed in pairs on the wings 203. In such a case, the optimiser may split the engines 110a-d into pairs to ensure thrust is distributed symmetrically. For instance, the outboard engines 210c, 210d may comprise a first pair, and the inboard engines 210a, 210b may comprise a second pair. The thrust of each engine within each pair is constrained to be equal to the thrust of the other engine in that pair, but different to the thrust generated by that of the other pair by the optimiser. Consequently, noise can be minimised, whilst avoiding asymmetric thrust during flight. In other cases, the optimiser may split the engines 110a-d into an alternative grouping if it enables a greater reduction in noise without exceeding constraints described in previous paragraphs.

Figure 7:
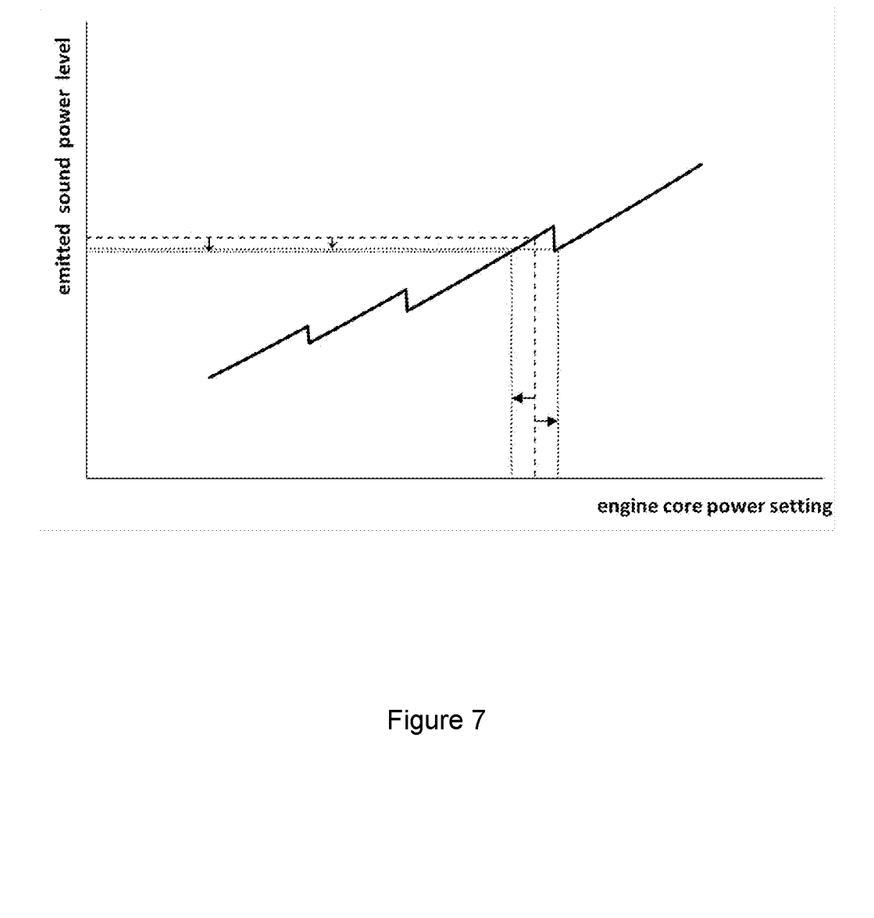
FIG. 7 is a graph illustrating a relationship between emitted sound and engine core power setting for a propulsion system operated in accordance with the disclosed method.

Whichever aircraft configuration is used, significant reductions in noise can be achieved using the system of the present disclosure. FIG. 7 illustrates how noise is reduced by operating the engines at engine core levels determined by the controller of the present disclosure.

In FIG. 7, the prior art thrust setting for all engines (i.e. the thrust setting that would be utilised for all engines to provide the required thrust if the engines were to be operated at the same thrust as each other) corresponds to a point close to a local maximum in handling bleed noise (shown by the dashed lines). By moving the first engine 10a to a higher engine core power setting, noise emitted by the engine 10a is reduced due to closure of a handling bleed (shown by the right-hand dotted line). By moving the second engine 10b to a correspondingly lower engine core power setting such that total thrust meets the required thrust, noise emitted by the second engine 10b can also be reduced (left-hand dotted line) due to reduced fan noise. The amount by which the engine core power setting of the first engine group differs from the prior art engine core power setting has been selected by the optimiser to yield a maximum reduction in emitted noise from all engines combined, given the aircraft thrust requirement and the shape of the curve of noise versus engine core power setting. The method is continually performed during at least the approach and/or final approach phase of flight, with each change in engine thrust setting resulting in a recalculation of the lowest noise solution.

While the system is primarily aimed at reducing overall propulsion system noise, it may be the case that fuel usage is reduced as well. As will be understood, the operation of a handling bleed represents wasted energy, since mechanical power must be used to compress the air, which is then dumped overboard. By operating one of the engines at a high engine core power, while reducing the engine core power of the other engine, at least one handling bleed is closed, which may reduce overall wasted energy, thereby reducing aircraft propulsion system fuel burn while the method is in operation.

Alternative aircraft engine configurations may also be employed. In one example, such as that shown in FIG. 8, an aircraft propulsion system 305 is provided, which is in the form of a parallel hybrid propulsion system.

Figure 8:
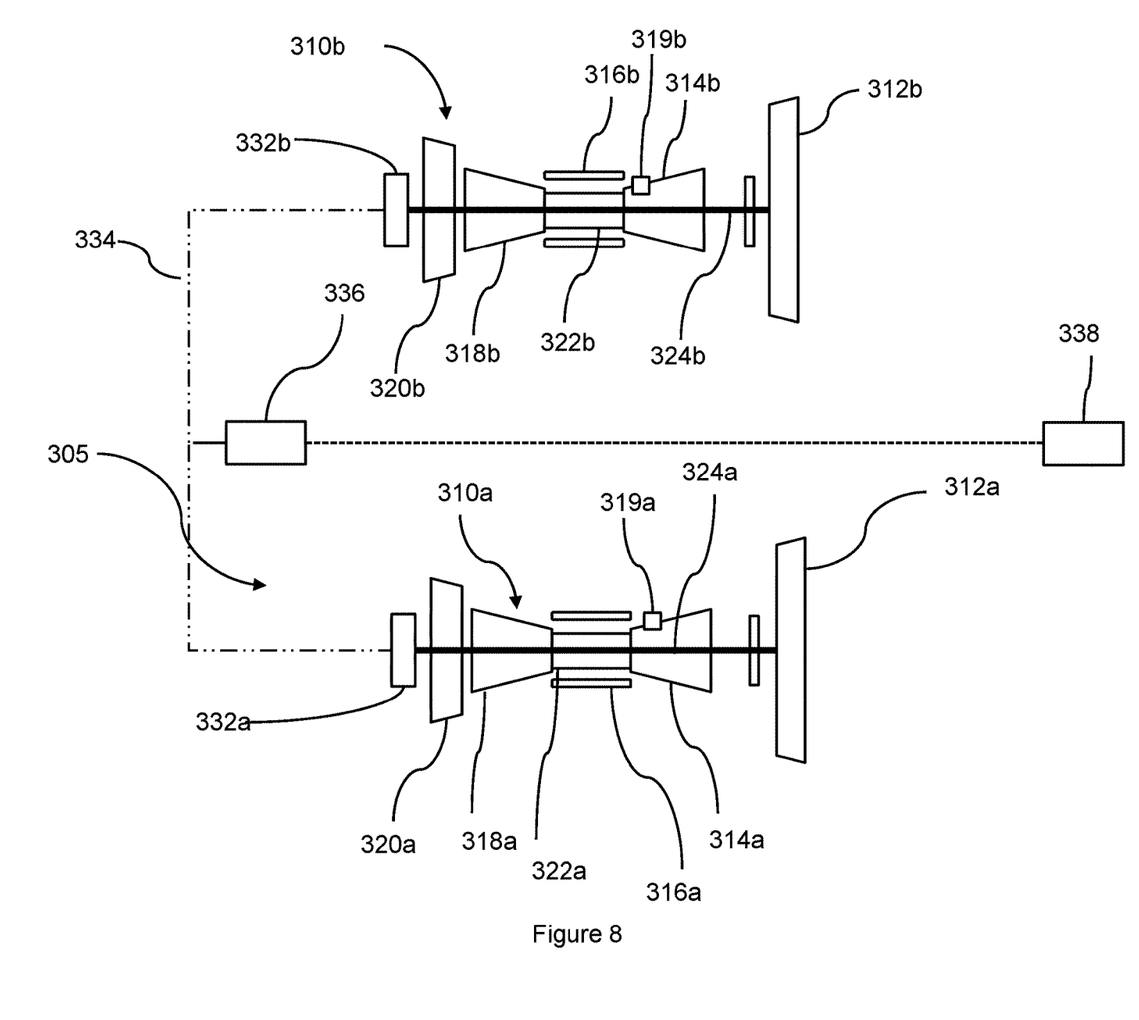
FIG. 8 is a schematic diagram of a hybrid propulsion system for the aircraft of any of FIG. 1, 5 or 6.

The propulsion system 305 comprises a pair of gas turbine engines 310a, 310b, which are similar to the engines 10a, 10b of the first embodiment having a fan 312, compressor 314 includes handling bleeds 319, combustion equipment 316 and turbines 318, 320. However, the propulsion system 305 also comprises a plurality of electrical machines 332a, 332b. In particular, the first gas turbine engine 310a comprises an electrical machine 332a capable of operating at least as an electric generator, and the second gas turbine engine 310b comprises an electrical machine 332b capable of operating at least as an electric motor. Typically however, each electric machine 332a, 332b is capable of operation as both an electric motor and as a generator. Each electric machine 332a, 332b is of a conventional type, such as an induction or permanent magnet electric machine, and is coupled to a respective low-pressure shaft 324a, 324b. Each machine 332a, 332b comprises a stator comprising electrical windings (not shown), which can be energised to produce a rotating magnetic field (when used as a motor) and interact with a rotating magnetic field generated by a rotor to be energised to produce electric current (when operated as a generator). Consequently, the fan 312b may be powered by either or both of the gas turbine engine 310b via the low-pressure turbine 320b, and the motor 332b, while the low-pressure turbine 320a of the gas turbine 10a drives the electric machine 332a to operate it as a generator.

An electrical interconnector 334 is provided, which electrically couples the electric machines 332a, 332b to one another, to allow for power transfer at least from the first gas turbine engine 310a low pressure shaft 324a via the electric generator 332a, to the second gas turbine engine 310b low pressure shaft 324b via the electric motor 332b. Optionally, each of the electric machines 332a, 332b may comprise motor generators, capable of being operated as either motors or generators, such that power can be transferred between engines 310a, 310b in either direction.

Transfer of power between engines 310a, 310b is controlled by a controller 336. The controller 336 may comprise power electronics configured to accept AC electrical power generated by one of the electric machines at a first frequency, and convert this to AC power at a second frequency, to control both electric motor power, and rotational speed. Alternatively, separate inverters and rectifiers may be provided. As a still further alternative, each of the machines 332a, 332b may comprise a DC machine, and the controller 336 may comprise a DC controller. An optional energy storage device 338 may be provided, which is configured to store energy provided by the generators for later use. The energy storage device 338 may for example comprise a chemical battery, supercapacitor, or other form of electrical energy storage.

The controller 336 is configured to modulate transfer of power in accordance with a signal received from an aircraft thrust controller. The aircraft thrust controller is operable to control a thrust generated from the engines 310*a*, 310*b*, and may comprise an aircraft throttle lever, autopilot, or autothrottle.

The controller 336 is operable to control the electric machines 332*a*, 332*b* to modulate power transfer between the engines 310*a*, 310*b* in accordance with an operational method similar to that of the first embodiment, and as shown in FIG. 4. However, the system has additional features or characteristics to reduce asymmetrical thrust.

Figure 9:
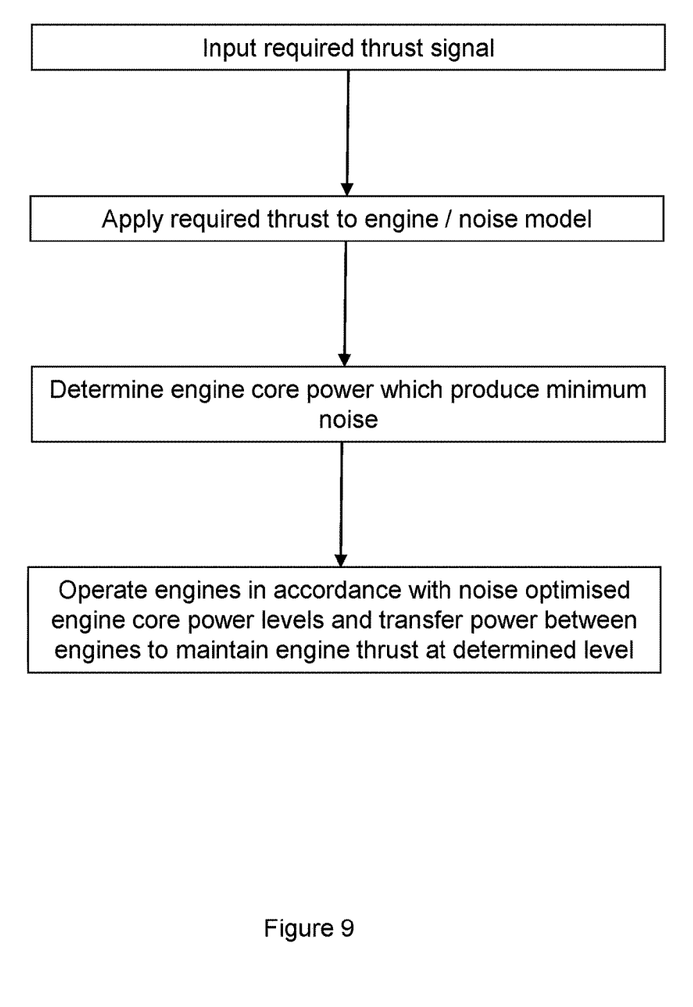
FIG. 9 is a flow diagram illustrating a method of operating the propulsion system of FIG. 8.

As illustrated in the flow diagram in FIG. 9, in a first step, the system determines the required thrust, in a similar manner to the method of FIG. 4.

The engine then applies the required thrust to the engine/noise model, again in a similar manner to the first embodiment. However, the engine/noise model may take into account the different nature of the hybrid propulsion system of FIG. 8, and the additional operational control parameter provided by the option to transfer power between engines.

For example, it will be appreciated that engine core power can be increased (i.e.

fuel flow to an engine can be increased), while maintaining thrust generated by that engine at the same or even a reduced thrust level. This is because a portion of the power generated by the low-pressure propulsive shaft 324*a*, 324*b* can be absorbed by the associated electrical machine 332*a*, 332*b* operating as a generator. Consequently, fan speed is not increased or may even be reduced, thereby preventing increased thrust.

Conversely, it will be appreciated that engine thrust can be increased without increasing engine core power, by transferring electrical power from the generator 332*a* to the motor 332*b* via the electrical interconnector 334 (or vice versa). This power may then be utilised to drive the propulsor 312*b* to increase thrust.

Similarly, it will be appreciated that all or a proportion of the power may be transferred to the energy storage device 338, instead of the other engine. Similarly, energy may be drawn from the storage device 338 to power a motor to provide additional propulsive power.

In one example therefore, the engines 310*a*, 310*b* may be operated at different engine core power levels, without producing different thrust. Consequently, noise levels can be reduced, while thrust asymmetry is avoided.

The engine noise/thrust model therefore includes additional parameters, such as motor power level (which may affect fan thrust and therefore noise) as well as engine core thrust, independent of fan thrust. The model also includes power transfer between the engines and energy storage/recovery.

Consequently, the method comprisies inputting a required thrust, and calculating a combination of gas turbine engine power levels and power offtakes/motor assists for each engine which provide the necessary thrust, with the minimum noise, In calculating this thrust, the system may comprise an optimiser, Since the system now has at least one (and optionally, two) additional parameters (power transfer and optionally power storage), the optimisation problem is now essentially one or three dimensional. For example, where no energy storage is provided, the only independent parameter is the change of power setting. For example, whether the system is aiming for a constant thrust or for a constant fan rotational speed N1, the system can identify how much mechanical power offtake is required from that one or more engine. After taking account of power conversion and power transfer inefficiencies, the system can then calculate how much mechanical input can be provided by the electric motor to the or each engine of the second group. The system can then calculate what level of fuel input is required to the or each engine of the second group in order to maintain overall thrust at the aircraft level. On the other hand, where energy storage is provided, 2 additional parameters are added: firstly the rate at which energy is being stored within or retrieved from the energy storage unit, and secondly how that amount is shared between the two engine groups.

Again, the optimiser may be subject to various constraints, similar to those of the method of FIG. 4. For example, the optimiser may be subject to a power transfer limit, comprising a limit to how much power may be transferred between the engines due electrical machine power limitations for instance. Similarly, where an energy storage unit is provided, an energy storage or recovery limit may be defined by energy storage device capacity and/or charge and discharge rate, The optimiser may select a core engine power difference which results in an engine power differential which goes above that which can be absorbed by the electrical machine, in which case a thrust asymmetry may be introduced.

In a fourth step, the engines are then operated in accordance with the determined engine power levels, and power is transferred between the engines, in accordance with the minimum noise profile determined in the third step.

It will be understood that the invention is not limited to the embodiments above-described and various modifications and improvements can be made without departing from the concepts described herein.

For example, different numbers of engines could be used, such as five or six engines. Different engine configurations could be utilised, with generators and motors being provided coupled to different shafts. The engines could be provided in different locations on the aircraft. For instance, all engines could be located at the tail, or engines could be distributed about the aircraft.

The engines could be in the form of turbofan engines, having a fan surrounded by a nacelle, or in the form of open rotor/turboprop engines, having propellers with no surrounding nacelle.

Except where mutually exclusive, any of the features may be employed separately or in combination with any other features and the disclosure extends to and includes all combinations and sub-combinations of one or more features described herein.

The invention claimed is:

1. An aircraft propulsion system comprising;
   at least first and second thrust producing gas turbine engines;
   a controller configured to control the at least first and second thrust producing gas turbine engines;
   wherein the controller is configured to:
   determine a required overall propulsion system thrust level; and
   determine an engine core power level contribution from each thrust producing gas turbine engine of the at least first and second thrust producing gas turbine engines such that the overall propulsion system produces a minimum overall noise level and meets the required overall propulsion system thrust level; wherein
   in meeting the minimum overall noise level, the at least first and second thrust producing gas turbine engines are operated at different engine core power settings.

2. The aircraft propulsion system according to claim 1, wherein the at least first and second thrust producing gas turbine engines comprises a first pair of thrust producing gas turbine engines and a second pair of thrust producing gas turbine engines, each pair being provided symmetrically at either side of an aircraft centreline.

3. The aircraft propulsion system according to claim 1, wherein the at least first thrust producing gas turbine engine is mounted substantially at a centreline of the aircraft, and a pair of second thrust producing gas turbine engines of the at least second thrust producing gas turbine engine are mounted on port and starboard sides respectively of the aircraft.

4. The aircraft propulsion system according to claim 1, wherein the at least first and second thrust producing gas turbine engines are mounted on port and starboard sides of the aircraft respectively.

5. The aircraft propulsion system according to claim 1, wherein each thrust producing gas turbine engine comprises one or more compressor which comprises one or more engine compressor handling bleed.

6. The aircraft propulsion system according to claim 1, wherein the controller is configured to determine an individual noise contribution from one or more of a handling bleed, a bypass air flow and a core air flow for an associated engine power condition.

7. The aircraft propulsion system according to claim 6, wherein the controller is configured to determine an overall engine noise contribution for an associated engine power condition for each thrust producing gas turbine engine of the at least first and second thrust producing gas turbine engines, and determine a combination of engine power conditions of the propulsion system which produce the required thrust at the minimum overall noise level.

8. The aircraft propulsion system according to claim 6, wherein the individual or overall noise contribution comprises a perceived noise contribution, which uses at least noise frequency and amplitude.

9. The aircraft propulsion system according to claim 1, wherein the controller comprises an online model such as a cost function, or a look-up table, to correlate overall engine noise contribution to an associated engine power condition.

10. The aircraft propulsion system according to claim 9, wherein the controller is configured to operate the at least first and second thrust producing gas turbine engines in a group to minimise thrust asymmetry when operating the at least first and second thrust producing gas turbine engines at different engine core powers.

11. The aircraft propulsion system according to claim 1, wherein the aircraft propulsion system comprises a hybrid propulsion system comprising a first electric machine coupled to a first propulsor of the at least first thrust producing gas turbine engine and a second electric machine coupled to a second propulsor of the at least second thrust producing gas turbine engine.

12. The aircraft propulsion system according to claim 11, wherein the first electric machine is configured to operate as a generator, the second electric machine is configured to operate as a motor and an electrical interconnector is arranged to electrically interconnect the first and second electric machines.

13. The aircraft propulsion system according to claim 12, wherein the controller is configured to control the at least first and second thrust producing gas turbine engines in order to transfer power from the at least first thrust producing gas turbine engine to the at least second thrust producing gas turbine engine.

14. An aircraft comprising the aircraft propulsion system of claim 1.

15. A method of operating an aircraft propulsion system, the aircraft propulsion system comprising:
- at least first and second thrust producing gas turbine engines; wherein the method comprises:
- determining a required overall propulsion system thrust level; and
- determining an engine core power level contribution from each thrust producing gas turbine engine of the at least first and second thrust producing gas turbine engines such that the overall propulsion system produces a minimum overall noise level and meets the required overall propulsion system thrust level; wherein
- in meeting the minimum overall noise level, the at least first and second thrust producing gas turbine engines are operated at different engine core power settings.

16. A controller configured to carry out the method of claim 15.

* * * * *